US012317379B2

(12) United States Patent
Cowan

(10) Patent No.: US 12,317,379 B2
(45) Date of Patent: May 27, 2025

(54) COOKING CONTAINER SENSING FOR IGNITION TRIGGERING AND PROGRAMMED COOKING

(71) Applicant: Midea Group Co., Ltd., Foshan (CN)

(72) Inventor: Richard W. Cowan, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 366 days.

(21) Appl. No.: 17/833,011

(22) Filed: Jun. 6, 2022

(65) Prior Publication Data

US 2022/0304115 A1 Sep. 22, 2022

Related U.S. Application Data

(62) Division of application No. 16/587,211, filed on Sep. 30, 2019, now Pat. No. 11,357,080.

(51) Int. Cl.
*F24C 3/12* (2006.01)
*H05B 1/02* (2006.01)

(52) U.S. Cl.
CPC ........... *H05B 1/0266* (2013.01); *F24C 3/122* (2013.01); *F24C 3/124* (2013.01); *H05B 2213/05* (2013.01); *H05B 2213/07* (2013.01)

(58) Field of Classification Search
CPC .............. H05B 1/0266; H05B 2213/05; H05B 2213/07; F24C 3/122; F24C 3/124
USPC .......................................................... 126/550
See application file for complete search history.

(56) References Cited

U.S. PATENT DOCUMENTS

| | | | | |
|---|---|---|---|---|
| 4,456,807 A * | 6/1984 | Ogino | H05B 6/062 219/626 |
| 7,428,901 B2 | 9/2008 | Gama et al. | |
| 8,931,473 B2 | 1/2015 | Baier et al. | |
| 9,078,449 B2 | 7/2015 | Bach et al. | |
| 9,599,345 B2 | 3/2017 | Mcafee et al. | |
| 9,638,426 B2 | 5/2017 | Golomb | |
| 9,909,763 B2 | 3/2018 | Rickert et al. | |
| 10,228,144 B2 | 3/2019 | Johncock et al. | |
| 2010/0181303 A1* | 7/2010 | Sakakibara | H05B 6/062 219/622 |
| 2010/0239987 A1 | 9/2010 | Baier | |
| 2012/0152932 A1 | 6/2012 | Moon et al. | |
| 2013/0270251 A1 | 10/2013 | Furuti et al. | |
| 2015/0156824 A1 | 6/2015 | Viroli et al. | |
| 2015/0308694 A1 | 10/2015 | Christiansen et al. | |
| 2016/0050720 A1 | 2/2016 | Jeanneteau et al. | |

(Continued)

FOREIGN PATENT DOCUMENTS

| | | |
|---|---|---|
| CN | 201310941 Y | 9/2009 |
| CN | 102193735 A | 9/2011 |

(Continued)

OTHER PUBLICATIONS

Liu et al., "Smart Stove Design Specification" Simon Fraser University, Mar. 2009.

(Continued)

*Primary Examiner* — Avinash A Savani
(74) *Attorney, Agent, or Firm* — Gray Ice Higdon

(57) ABSTRACT

A cooking appliance such as a range or stovetop incorporates cooking container sensing for controlling burner ignition and/or triggering events in programmed cooking sequences.

18 Claims, 4 Drawing Sheets

(56) References Cited

U.S. PATENT DOCUMENTS

| | | | | |
|---|---|---|---|---|
| 2018/0292092 | A1 | 10/2018 | Bhogal | |
| 2019/0003719 | A1 | 1/2019 | Wilson | |
| 2019/0166656 | A1* | 5/2019 | Hicks | H05B 1/0266 |
| 2021/0100071 | A1 | 4/2021 | Cowan | |

FOREIGN PATENT DOCUMENTS

| | | | |
|---|---|---|---|
| CN | 105708305 | A | 6/2016 |
| EP | 2187131 | B1 | 5/2010 |
| EP | 2863128 | A1 | 4/2015 |
| EP | 3294040 | A1 | 3/2018 |
| JP | UP4126037 | B2 | 7/2008 |
| JP | 4410363 | B2 | 2/2010 |
| JP | 2010230187 | A | 10/2010 |
| JP | 5204196 | B2 | 6/2013 |
| JP | 5868922 | B2 | 2/2016 |
| TW | 201708772 | A | 3/2017 |
| WO | WO2000063620 | A1 | 10/2000 |
| WO | WO2008031645 | A1 | 3/2008 |
| WO | WO2013061241 | A1 | 5/2013 |
| WO | WO2016181191 | A1 | 11/2016 |

OTHER PUBLICATIONS

International Search Report and Written Opinion issued in Application No. PCT/CN2020/097897, dated Sep. 29, 2020.

* cited by examiner

COOKING CONTAINER SENSING FOR IGNITION TRIGGERING AND PROGRAMMED COOKING

BACKGROUND

Gas fired cooking appliances typically include one or more gas heating elements coupled to a main gas line on the appliance that provides a flow of gas to the heating elements, sometimes referred to as burners. Operation of the burners and heating elements is usually accomplished via control knobs mounted on a top or front wall of the appliance in front of a cooktop. When a control knob is actuated, a flow of gas is supplied to the associated burner through a gas valve, and an ignition module creates a spark to ignite the gas, thereby producing a flame. The ANSI Z21.1 standard for Household Cooking Gas Appliances requires two separate manual operations to open a gas valve connected to a burner. The traditional manual gas valve requires a user to push and then turn the control knob manually associated with the gas valve stem to open the valve. Locations for such knobs are restricted due to the knobs requiring mechanical connections with the gas valves themselves. Further, the mechanically adjustable valves associated therewith offer limited precision in control of the resulting heat level of the associated burners. Accordingly, further advances are desired.

Digital gas control systems generally offer more flexibility and accuracy of operation for gas fired cooking appliances as digital gas valves are able to be remotely controlled via an electrical signal with a higher level of precision. Using digital gas valves as a method of controlling a gas flow to the burner of a cooking appliance such as a range, cooktop, grill, stovetop, etc., provides a greater control than can be achieved manually. However, digital gas fired cooking appliances are still subject to code requirements mandating the user to take two separate manual operations to ignite a burner.

Accordingly, there is still a need in the art for a more flexible method for controlling digital cooking appliances.

SUMMARY

The herein-described embodiments address these and other problems associated with the art by using cooking container sensing for controlling burner ignition and/or triggering events in programmed cooking sequences.

Therefore, consistent with one aspect of the invention, a cooking appliance may include a gas burner including an igniter, a sensor configured to detect a presence of a cooking container on the gas burner, a gas valve in fluid communication with the gas burner, and a controller coupled to the sensor, the gas valve and the igniter. The controller herein may be configured to wait a predetermined period of time for a user input to activate the gas burner in response to detecting the presence of the cooking container on the gas burner with the sensor, and to control the gas valve and the igniter to ignite the gas burner in response to receiving the user input prior to an end of the predetermined period of time.

In some embodiments, the cooking appliance may also include a user interface associated with the gas burner and coupled to the controller, and the user input is received by the user interface. Further, in some embodiments, the user interface may include a touch-sensitive knob, and the user input may be a user touching the touch-sensitive knob, or turning the touch-sensitive knob. In some embodiments, the user interface may include a dedicated ignition control, and the user input may be a user selecting the dedicated ignition control. In some embodiments, the user interface may include a control selector, and the user input may be a user actuating the control selector. In some embodiments, the user interface may include a digital camera, and the user input may be a gesture by a user sensed by the digital camera. In some embodiments, the user interface may include a microphone, and the user input may be a voice command by a user. In some embodiments, the user interface may include a touch screen, and the user input may be a user touching the touch screen. In some embodiments, the user interface may include an application on a mobile device, and the user input may be a user actuating the application on the mobile device.

In some embodiments, the sensor in the cooking appliance may include an optical sensor, a proximity sensor, a weight sensor, a magnetic sensor, a conductive sensor, an image sensor, or an inductive piezoelectric sensor.

Also, in some embodiments, the cooking appliance may include an indicator, and the controller may be configured to illuminate the indicator in response to detecting the presence of the cooking container on the gas burner with the sensor. In some embodiments, the indicator may be on or proximate a control knob associated with the gas burner. Also, in some embodiments, the controller may be configured to discontinue illuminating the indicator after a predetermined waiting period.

In some embodiments, the controller may be configured to ignore a second user input received after the predetermined period of time such that the gas valve is not opened and the igniter is not actuated in response to the second user input. In addition, in some embodiments, the controller may be configured to start a timer in response to detecting the presence of the cooking container on the gas burner with the sensor, and to determine whether the user input is received within the predetermined period of time using the timer. In some embodiments, the controller may further be configured to turn off the gas burner in response to detecting a non-presence of the cooking container on the gas burner with the sensor.

Consistent with another aspect of the invention, a method of controlling a cooking appliance may include detecting with a sensor a change in a presence of a cooking container on a burner of the cooking appliance, and triggering an action in a programmed cooking sequence in response to detecting the change in the presence of the cooking container on the gas burner with the sensor.

Some embodiments may further include, with the controller, detecting placement of the cooking container on the burner with the sensor, waiting a predetermined period of time for user input to activate the burner, controlling a gas valve and an igniter for the burner to ignite gas supplied by the gas valve to the burner in response to receiving the user input prior to an end of the predetermined period of time, and ignoring user input received after the predetermined period of time such that the gas valve is not opened and the igniter is not actuated in response to the user input received after the predetermined period of time.

In addition, in some embodiments, when the change in presence is placement of the cooking container on the gas burner, the action in the programmed cooking sequences may include verifying the correct cooking container is used, indicating to the user about what to put in the cooking container, turning on a timer, or moving to a next step in the programmed cooking sequence. In some embodiments, when the change in presence is removal of the cooking container from the gas burner, the action in the programmed cooking sequences may include alerting the user about the time elapsed, indicating to the user about what to do next, turning off the burner, and turning on or off the timer.

Consistent with another aspect of the invention, a cooking appliance may include a burner, a sensor configured to detect a presence of a cooking container on the burner, and a controller coupled to the sensor. The controller herein may be configured to wait a predetermined period of time for a user input to activate the burner in response to detecting the presence of the cooking container on the burner with the sensor, and to activate the burner in response to receiving the user input prior to an end of the predetermined period of time. Also, in some embodiments, the burner of the cooking appliance is a gas burner, and the cooking appliance further includes a gas valve that regulates a flow of gas to the gas burner, and an igniter that ignites gas supplied to the gas burner by the gas valve. The controller herein may be configured to activate the gas burner by controlling the gas valve to supply gas to the gas burner and controlling the igniter to ignite the gas supplied to the gas burner by the gas valve.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
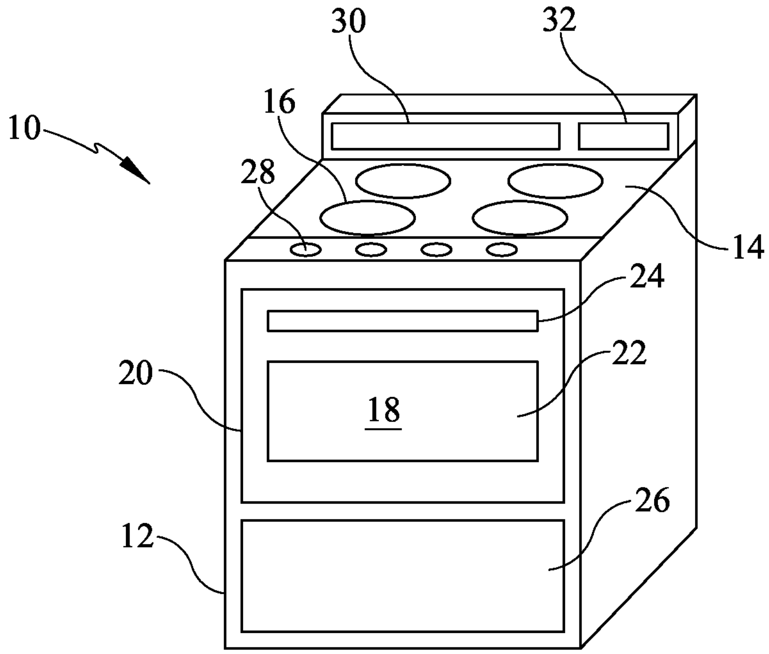
FIG. 1 is a perspective view of a cooking appliance consistent with some embodiments of the invention.

Turning now to the drawings, wherein like numbers denote like parts throughout the several views, FIG. 1 illustrates an example cooking appliance 10 in which the various technologies and techniques described herein may be implemented. Cooking appliance 10 is a residential-type range, and as such includes a housing 12, a stovetop or cooktop 14 including a plurality of burners 16, and an oven 18 defining a cooking cavity accessed via an oven door 20 having a window 22 and a handle 24. Cooking appliance 10 may also include a storage drawer 26 in some embodiments, or in other embodiments, may include a second oven. Various cooking elements (not shown in FIG. 1) may also be incorporated into cooking appliance 10 for cooking food in oven 18, e.g., one or more electric or gas heating elements.

Cooking appliance 10 may also include various user interfaces, including, for example, control knobs 28 for controlling burners 16, a control panel 30 for controlling oven 18 and/or burners 16, and a display 32 for providing visual feedback as to the activation state of the cooking appliance. It will be appreciated that cooking appliance 10 may include various types of user controls in other embodiments, including various combinations of switches, buttons, knobs and/or sliders, typically disposed at the rear or front (or both) of the cooking appliance. Further, in some embodiments, one or more touch screens may be employed for interaction with a user. In addition, in some embodiments, control knobs 28 may be touch sensitive to receive a user input via touching, and may be rotatable to control the heat level of burners 16. In some embodiments, a user interface may include a dedicated ignition control to receive the user input via selection by the user. The dedicated ignition control may be various combinations of switches, buttons, knobs and/or sliders. In addition, a user interface may include a control selector for the user selection.

Further, in some embodiments, user input may be received via a spoken or gesture-based interface, and audio feedback may be provided to the user via one or more speakers. In some embodiments, a user interface may include a digital camera to receive a gesture by the user as user input. In some embodiments, a user interface may also include a microphone to receive a voice command by the user as user input.

In some embodiments, display 32 may be touch sensitive screen to receive user input in addition to displaying status information and/or otherwise interacting with a user. In still other embodiments, cooking appliance 10 may be controllable remotely, e.g., via a smartphone, tablet, personal digital assistant or other networked computing device, e.g., using a web interface or a dedicated app.

Display 32 may also vary in different embodiments, and may include individual indicators, segmented alphanumeric displays, and/or dot matrix displays, and may be based on various types of display technologies, including LEDs, vacuum fluorescent displays, incandescent lights, etc.

As noted above, cooking appliance 10 of FIG. 1 is a range, which combines both a stovetop and one or more ovens, and which in some embodiments may be a standalone or drop-in type of range. In other embodiments, however, cooking appliance 10 may be another type of cooking appliance, e.g., a drop-in stovetop, etc. In general, a cooking appliance consistent with the invention may be considered to include any residential-type appliance including a housing and one or more cooking elements disposed thereon and configured to generate energy for cooking food.

In turn, a cooking element may be considered to include practically any type of energy-producing element used in residential applications in connection with cooking food, e.g., employing various cooking technologies such as electric, gas, light, microwaves, induction, convection, radiation, etc. In the case of an oven, for example, one or more cooking elements therein may be gas, electric, light, or microwave heating elements in some embodiments, while in the case of a stovetop, one or more cooking elements therein may be gas, electric, or inductive heating elements in some embodiments. Further, it will be appreciated that any number of cooking elements may be provided in a cooking appliance, and that multiple types of cooking elements may be combined in some embodiments, e.g., combinations of microwave and light cooking elements in some oven embodiments.

Figure 2:
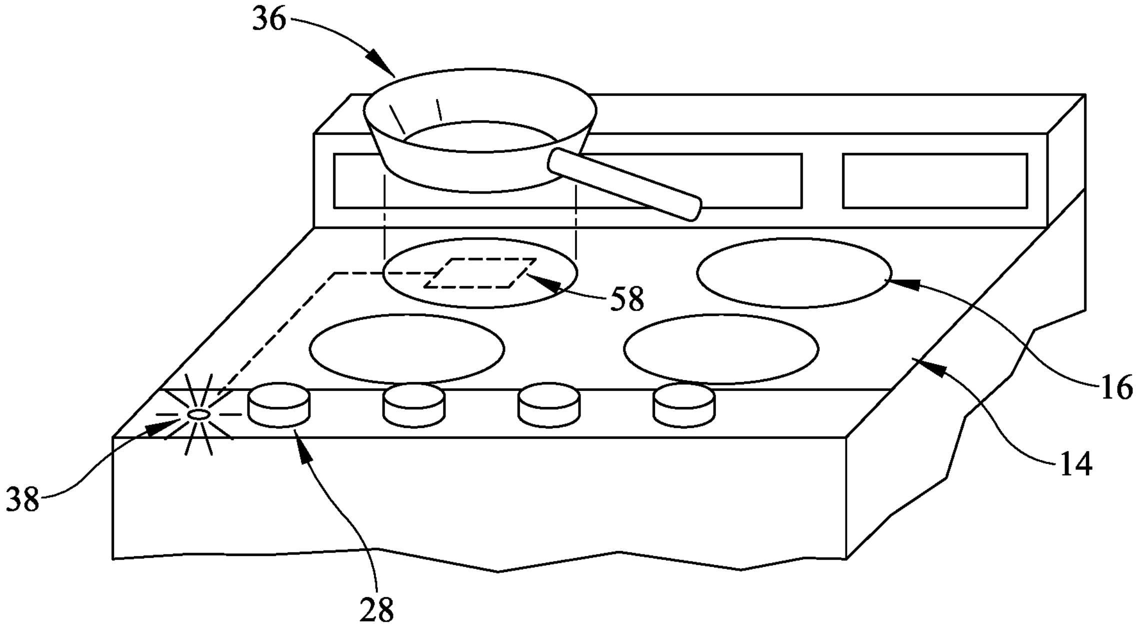
FIG. 2 is a close-up view of a cooktop of the exemplary cooking appliance of FIG. 1 consistent with some embodiments of the invention.

In some embodiments of the invention, a cooking container or pan sensor may be used to control activation of a cooktop burner, generally in connection with an additional user input action that is performed after a pan or other cooking container is placed on a burner. FIG. 2 illustrates an example cooktop 14 with four burners 16. It is contemplated that the cooktop 14 can be configured to include any number and/or size of burners 16. In addition, in some embodiments, a burner 16 can be used in combination with other types of cooking heating sources, such as an electrical resistance element or an induction coil element. In addition, each burner 16 includes a cooking container or pan sensor 58 that is configured to sense the presence of a pan or other cooking container 36 placed on the burner. The sensor 58 used to detect the pan 36 on the burner 16 may be one of a number of types of sensors, including, but not limited to, an optical sensor, a proximity sensor, a weight sensor, a magnetic sensor, a conductive sensor, an image sensor, or an inductive piezoelectric sensor, and generally can be any type of sensor capable of detecting the presence of a cooking container on a burner. In one embodiment, for example, the sensor may include a spring-loaded plunger or switch that projects above a surface of a burner and that is depressed when a container is placed on the burner. The cooking container can be a pan, a pot, a wok, and/or any other type of cooking utensil. For example, a pan 36 can be detected by the sensor 58 when the pan 36 is placed on one of the burners 16 by a user. Additionally, a single sensor 58 may be capable of sensing the presence of the pan 36 on any of a number of burners 16, or there may be individual sensors 58, with one associated with each burner 16, so long as the sensor(s) 58 are able to distinguish on which burner 16 the pan 36 has been placed. In some embodiments, for example, a single overhead image sensor may be used to monitor whether a cooking container has been placed on any of the burners on a stovetop.

The cooktop 14 also may include an indicator 38 capable of being illuminated when the pan 36 is placed on one of the burners 16 by the user, showing to the user that a pan has been sensed, and in some instances, on which burner 16 the pan 36 has been placed. The indicator can be a simple array of LEDs, which are on or proximate each control knob 28 associated to the corresponding burner 16. Upon placing the pan 36 on one of the burners 16, the indicator 38 proximate the specific control knob 28 associated with the corresponding burner 16 may give a signal such as a light, as a method to show that the pan 36 has been sensed on one of the burners 16, and to indicate that a further user input is needed to continue the ignition sequence. As best illustrated in FIG. 2, when the pan 36 is placed on one of the burners 16, the sensor 58 detects the presence of the pan 36, which causes the indicator 38 associated with the corresponding control knob 28 to be illuminated.

Also, in some embodiments, indicator 38 may be deactivated after a predetermined time interval. For example, after a predetermined waiting period (e.g., about two or three seconds), the indicator 38 may be deactivated such that the indicator does not continue to illuminate in the case that the user only places the pan 36 on the burner 16 without the intention of immediately igniting the burner 16. In this case, the burner 16 can still be ignited later by actions like touching and turning the control knob 28 associated with the corresponding burner 16.

Additional modifications may be made in other embodiments. A cooking appliance consistent with the invention may also include one or more controllers configured to control the cooking elements and otherwise perform cooking operations at the direction of a user.

Figure 3:
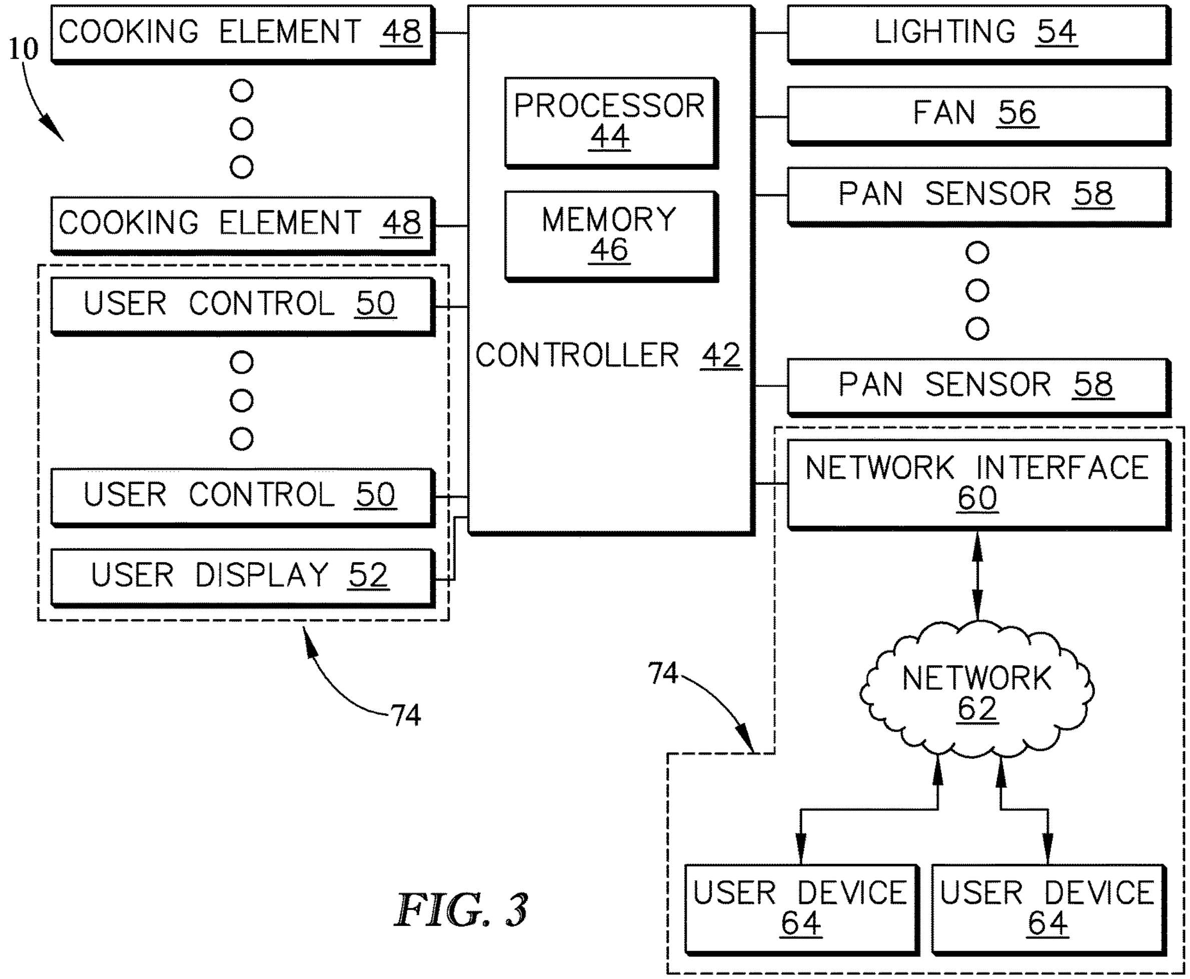
FIG. 3 is a block diagram of an example control system for a cooking appliance consistent with some embodiments of the invention.

FIG. 3, for example, illustrates an example control system for cooking appliance 10 including a controller 42 that receives inputs from a number of components and drives a number of components in response thereto. Controller 42 may, for example, include one or more processors 44 and a memory 46 within which may be stored program code for execution by the one or more processors. The memory may be embedded in controller 42, but may also be considered to include volatile and/or non-volatile memories, cache memories, flash memories, programmable read-only memories, read-only memories, etc., as well as memory storage physically located elsewhere from controller 42, e.g., in a mass storage device or on a remote computer interfaced with controller 42. Controller 42 can be the only controller of the cooking appliance 10, or it could be a sub controller of the overall appliance controller. If it is a sub controller, it can be located within the overall appliance controller or separate from such controller. Controller 42 can also be provided with other features as will be further described herein.

Figure 4:
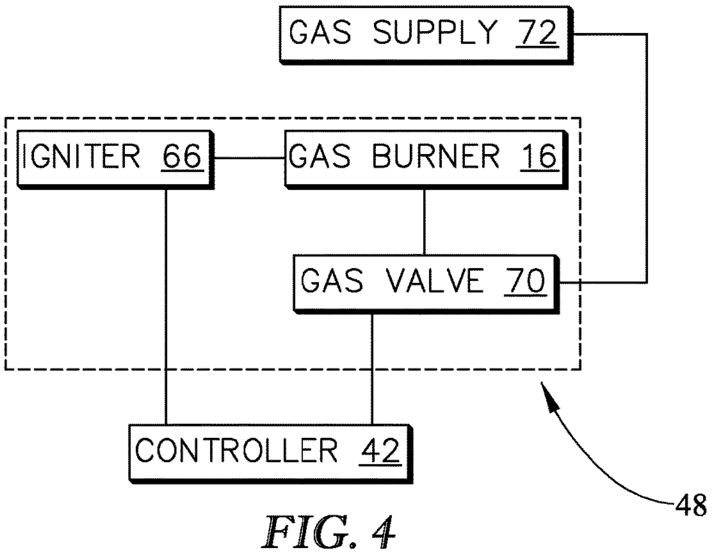
FIG. 4 is a block diagram of an example cooking element for the cooking appliance consistent with some embodiments of the invention.

As shown in FIG. 3, controller 42 may be interfaced with various components, including various cooking elements 48 used for cooking food (e.g., various combinations of gas, electric, inductive, light, microwave, light cooking elements, among others, which as discussed below in connection with FIG. 4 may include cooking elements that incorporate burners 16), one or more user controls 50 for receiving user input (e.g., various combinations of switches, knobs, buttons, sliders, touchscreens or touch-sensitive displays, microphones or audio input devices, image capture devices, etc.), and a user display 52 (including various indicators, graphical displays, textual displays, speakers, etc.), as well as various additional components suitable for use in a cooking appliance, e.g., lighting 54 and/or one or more fans 56 (e.g., convection fans, cooling fans, etc.), among others. User controls 50, user display 52 and/or network interface 60 may be considered to collectively implement a user interface 74 in some embodiments of the invention.

Controller 42 may also be interfaced with various sensors, e.g., pan sensors 58 used to sense the presence of a cooking container such as a pan 36 on a burner 16. Additional sensors may include sensors configured to detect environmental conditions inside of and/or external to cooking appliance 10, e.g., one or more temperature sensors, humidity sensors, air quality sensors, smoke sensors, carbon monoxide sensors, odor sensors and/or electronic nose sensors, among others. Such sensors may be internal or external to cooking appliance 10, and may be coupled wirelessly to controller 42 in some embodiments.

In some embodiments, controller 42 may also be coupled to one or more network interfaces 60, e.g., for interfacing with external devices via wired and/or wireless networks such as Ethernet, Wi-Fi, Bluetooth, NFC, cellular and other suitable networks, collectively represented in FIG. 3 at 62. Network 62 may incorporate in some embodiments a home automation network, and various communication protocols may be supported, including various types of home automation communication protocols. In other embodiments, other wireless protocols, e.g., Wi-Fi or Bluetooth, may be used.

In some embodiments, cooking appliance 10 may be interfaced with one or more user devices 64 over network 62, e.g., computers, tablets, smart phones, wearable devices, etc., and through which cooking appliance 10 may be controlled and/or cooking appliance 10 may provide user feedback.

In some embodiments, controller 42 may operate under the control of an operating system and may execute or otherwise rely upon various computer software applications, components, programs, objects, modules, data structures, etc. In addition, controller 42 may also incorporate hardware logic to implement some or all of the functionality disclosed herein. Further, in some embodiments, the sequences of operations performed by controller 42 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

In some embodiments consistent with the invention, cooking container sensing may be used in connection with a digital gas cooking system including one or more gas burners that are regulated using digitally-controlled valves. For example, as shown in FIG. 4, in some embodiments a cooking element 48 interfaced with the controller 42 may include a gas burner 16, an igniter 66, and a digitally-controlled gas valve 70 coupled to a gas supply 72. Gas valve 70 is controllable by controller 42 to regulate the gas flow to gas burner 16. Igniter 66 is configured to create a spark to ignite gas supplied to gas burner 16 by gas valve 70. Controller 42 is configured in some embodiments to control gas valve 70 proportionally in accordance with user input, e.g., via a control knob 28, and thereby control the output level of burner 16.

Figure 5:
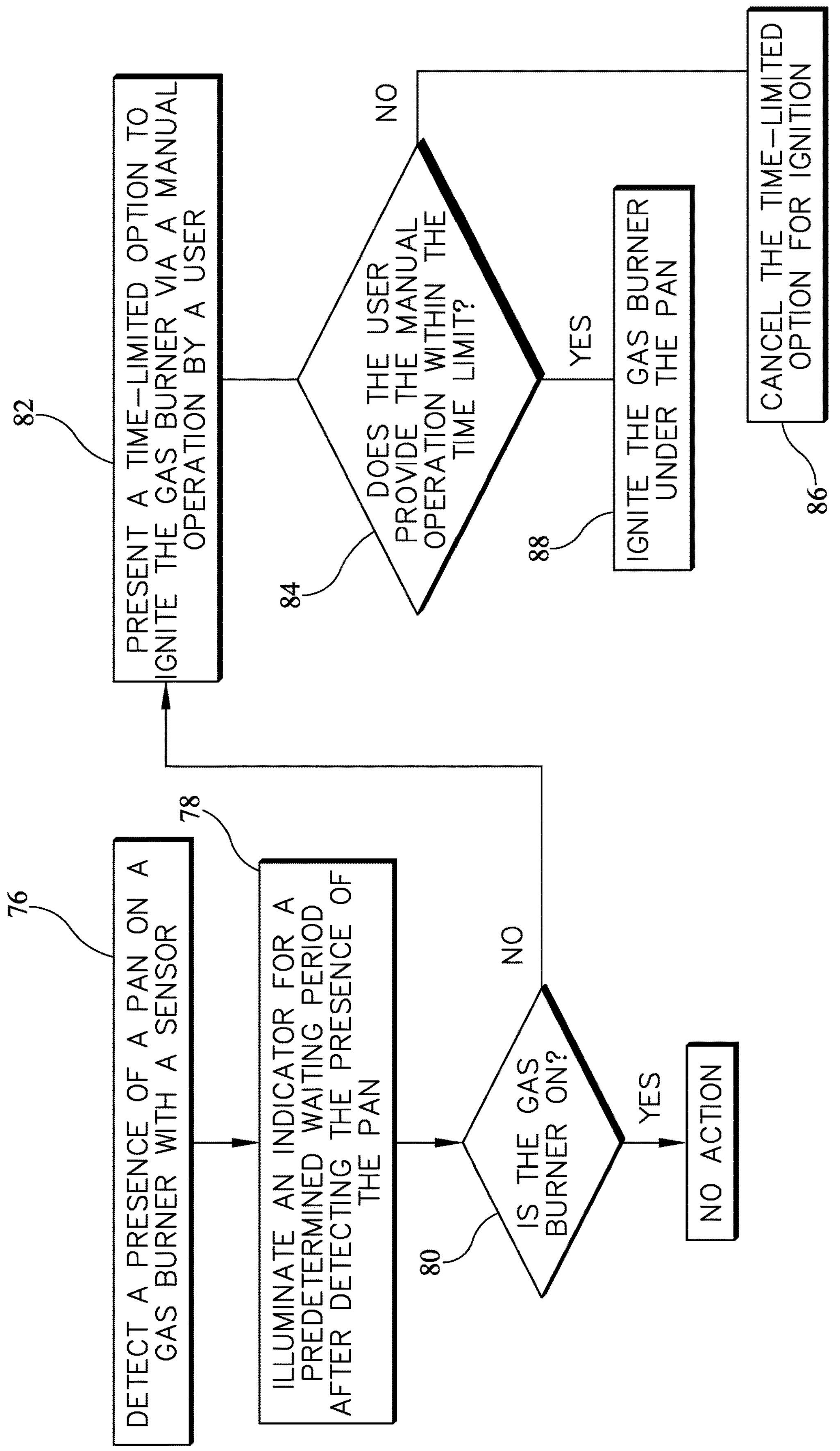
FIG. 5 is a flowchart illustrating an example sequence of operations for igniting a gas burner using the cooking appliance of FIG. 1.

Now turning to FIG. 5, as mentioned earlier, the ANSI Z21.1 standard for Household Cooking Gas Appliances generally requires two separate manual operations in order to open a gas valve connected to a burner. Embodiments consistent with some embodiments of the invention may use cooking container sensing as one of the two manual operations required by the ANSI Z21.1 standard, such that one additional manual operation, e.g., turning a gas knob, may be used to generate a signal that opens a digital gas valve, and ignite a burner, thereby providing more flexibility to consumers. FIG. 5 in particular illustrates a flowchart of a two-step gas burner ignition operation sequence 75 using pan placement as one of the two required manual operations. Sequence 75 begins in block 76 by a detection of a presence of the pan 36 via the sensor 58. The action involved in block 76 is taken as the first manual operation by a user in this two-step ignition sequence 75. Next, in block 78, in some embodiments, the indicator 38 may be illuminated for a predetermined waiting period as a signal to the user indicating the pan 36 is sensed. Next, the control passes to block 80 to determine whether the burner 16 is on or off (e.g., based upon the status of gas valve 70 or igniter 66, or based upon a thermocouple, a flame detector or other sensor capable of determining whether the burner is currently on), and if the burner 16 is on, no further action is needed. If the burner 16 is off, however, control passes onto block 82 to present a time-limited option to ignite the burner 16 via a second manual operation performed within a predetermined period of time. Different actions may be used as the second manual operation, e.g., user interface selection, touching or turning the control knob associated with the burner, selecting a dedicated ignition control, issuing a voice or gesture command by the user, actuating the control selector associated with the burner, etc. The terms "ignition control" or "control selector" are used herein generally to describe various devices that are operatively coupled to functional components of the cooking appliance 10 and which may typically, but not exclusively, be operated by hand by a user. Typical, ignition controls and control selectors may include but are not limited to gas and electric burner controls, start and stop controls, switches, sliders, pushbuttons, wheels, levers, and various other functional controls associated with an appliance. An ignition control or control selector may also be used to refer to a programmed button selection on a touch-screen or similar operator interface. Those exemplary and other user actions may be taken as the second manual operation of the two-step ignition sequence. Control then passes to block 84 to determine whether the user has provided the second manual operation input within the predetermined period of time. If the user does provide the second manual operation within the predetermined period of time, block 84 passes control to block 88 to ignite the burner 16 on which the pan 36 is placed on by the user, e.g., by opening gas valve 70 and activating igniter 66 for a predetermined period of time. If not, however, block 84 passes control to block 86 to cancel the time-limited option for ignition.

One embodiment consistent with the invention includes the way to turn off the burner 16 following the removal of the cooking container by the user. Accordingly, user interface 74 may include a user setting configured to turn off the burner 16 if the pan 36 is removed. The user setting can be just one manual operation as the ANSI Z21.1 only requires one manual operation to turn off a burner. The one manual operation can be touching or turning the touch sensitive control knob, selecting a switch or button, touching a touch screen, etc.

It should be noted that if any user input (e.g., a user attempt to perform the second manual operation) is provided by the user after the predetermined period of time, the controller 42 is configured to ignore the second manual operation so the burner 16 will not be ignited.

The predetermined period of time can be a few seconds, for example, two seconds to ten second or even twenty seconds. Other durations may be used in other embodiments, however, so the invention is not limited to this particular range.

In some embodiments, the controller 42 may set a timer to track the predetermined period of time. When the presence of the pan 36 is detected, the controller 42 may be configured to start the timer 86, and to determine whether the second manual operation is provided by the user or not within the predetermined period of time based upon the current value of the timer when the user input is received.

In addition to or in lieu of using pan sensing as a manual operation in a two-step gas burner ignition process, cooking container sensing may be used as an input for programmed cooking, e.g., as a trigger in a programmed cooking sequence. A programmed cooking sequence may refer, for example, to a multi-step cooking process where various actions are taken at different points in a cooking operation, e.g., adding ingredients, applying heat, changing heat level, mixing, stirring, simmering, resting, removing from heat, combining multiple cooking containers, and other steps that are ordinarily taken when following a recipe. In some embodiments of the invention, a cooking appliance may be configured to incorporate programmed cooking sequences that are selected by a user, for example, via a user interface of the cooking appliance or a mobile app, and for which various steps in the cooking sequences are displayed to the user to provide instructions to the user on how to follow the sequences at appropriate times in those sequences. In some embodiments of the invention, pan sensing consistent with the invention may be used within a programmed cooking sequence such that changes in the presence of a cooking container may be used to cause certain steps to happen during the sequence.

Figure 6:
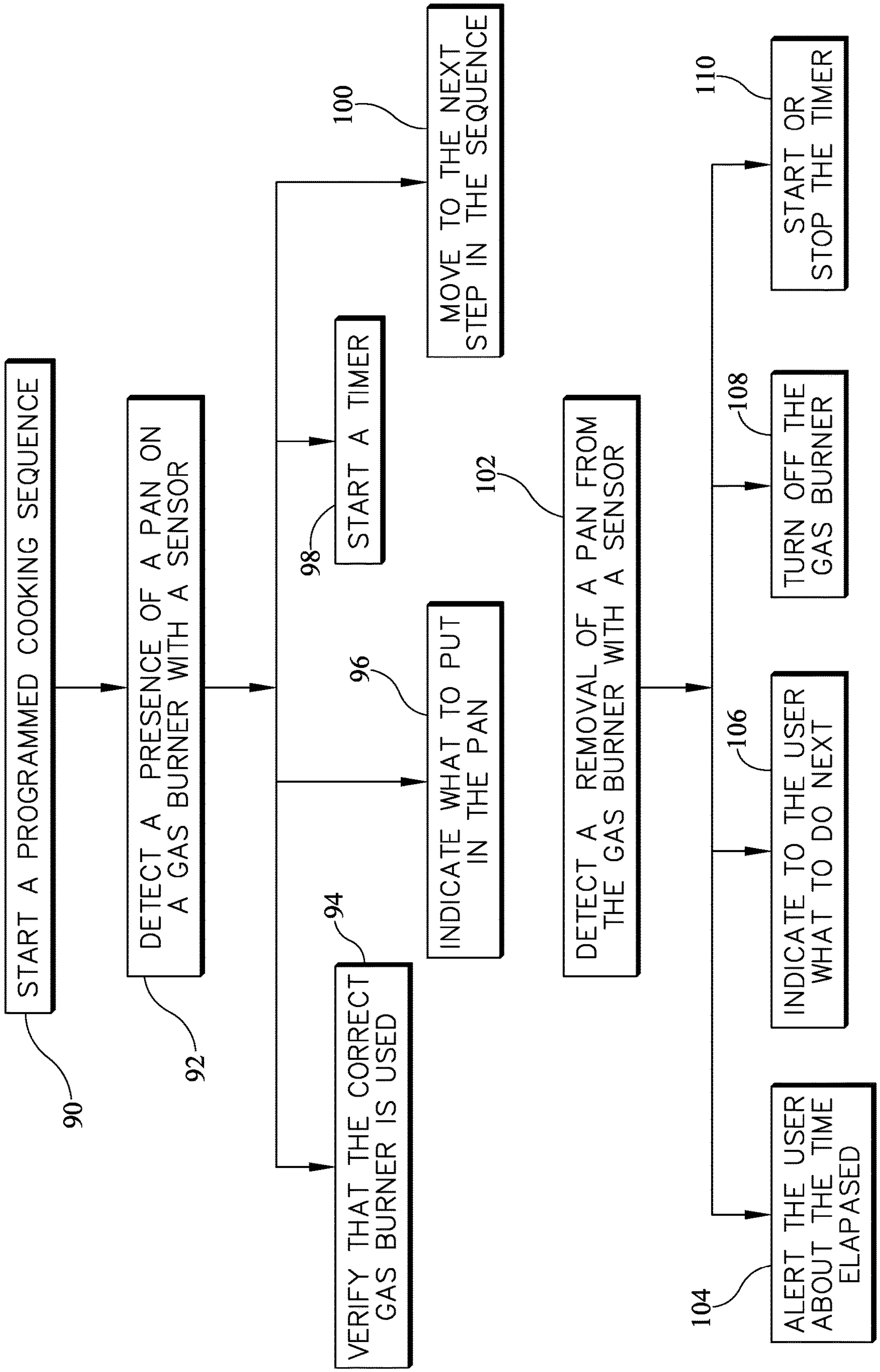
FIG. 6 is a flowchart illustrating an example sequence of operations for triggering programmed cooking.

FIG. 6, for example, illustrates a flowchart of an example control sequence 89 using pan sensing as a trigger event for programmed cooking. Sequence 89 begins in block 90 by starting a programmed cooking sequence. Next, in block 92, if a presence of the pan 36 is detected via the sensor 58, then the controller 42 is configured to feedback information or take actions including, but not limited to: verifying that the correct burner is used in block 94, indicating what to put into the pan in block 96, starting a timer in block 98, or moving to the next step in the sequence in block 100. Additionally, in block 102, if the pan 36 is removed and the removal is detected by the sensor 58, then the controller 42 is configured to feedback information or take actions including, but not limited to: alerting the user about the time elapsed, e.g., to indicate whether the pan has been removed after too little or too much time relative to a timer in block 104, to indicate to the user what to do next in block 106, to turn off the burner in block 108, or to turn on or off a timer in block 110.

As noted above, a programmed cooking sequence may be a series of steps for controlling the cooking appliance 10 to carry out sequences of cooking operations, each of which may, in some instances, use a different cooking heat level and/or time duration. For example, suppose the programmed cooking sequence is first to cook on high heat for 5 minutes, simmer for 10 minutes, remove from the burner, and rest the food for 3 minutes. When the placement of the pan 36 on the burner 16 is detected via the sensor 58, the controller 42 may be configured to switch the heat level of the burner 16 to high heat and start a 5-minute timer simultaneously. At the end of the 5 minutes, the controller 42 may be configured to switch the heat level of the burner 16 from high heat to low heat and start a new 10-minute timer. Then, at the end of the 10 minutes, the controller 42 may be configured to instruct the user to remove the pan 36 from the burner 16 and let the food rest for 3 minutes. Accordingly, when the pan 36 is removed from the burner 16, the controller 42 may be configured to turn off the burner 16 and start another 3-minute timer. At the end of the 3 minutes, the controller 42 may be configured to indicate to the user that the food is ready, concluding this exemplary programed cooking sequence. It will be appreciated that this programmed sequence is merely an example, and an innumerable number of different types of programmed cooking sequences may be supported in different embodiments.

The sequences 75 and 89 are discussed with reference to the exemplary gas cooktop appliance 10 illustrated in FIGS. 1 and 2. It will also be appreciated that sequence 75 and 89 may be implemented with any suitable cooktop system such as an electrical resistance cooktop system. It should be evident that these sequence 75 and 89 are by way of example, and that various changes may be made by adding, modifying or eliminating details without departing from the fair scope of the teaching contained in this disclosure. Furthermore, although FIGS. 5 and 6 depict steps performed in a particular order for purpose of illustration and discussion, the method discussed herein are not limited to any particular order or arrangement. One skilled in the art, using the disclosure provided herein, will appreciate that various steps of the methods can be omitted, rearranged, combined and/or adapted in various ways.

It will be appreciated that various modifications may be made to the embodiments discussed herein, and that a number of the concepts disclosed herein may be used in combination with one another or may be used separately. Therefore, the invention lies in the claims hereinafter appended.

What is claimed is:

1. A method of controlling a cooking appliance comprising:

detecting with a sensor a change in presence of a cooking container on a burner of the cooking appliance;

triggering an action in a programmed cooking sequence in response to detecting the change in presence of the cooking container on the burner with the sensor; and wherein the change in presence is placement of the cooking container on the burner, and wherein the action includes at least one of:

verifying the correct cooking container is used;

indicating to the user about what to put in the cooking container;

turning on a timer; and/or moving to a next step in the programmed cooking sequence.

2. The method of claim 1, further comprising a controller, with the controller:

detecting placement of the cooking container on the burner with the sensor;

waiting a predetermined period of time for user input to activate the burner;

controlling a gas valve and an igniter for the burner to ignite gas supplied by the gas valve to the burner in response to receiving the user input prior to an end of the predetermined period of time; and ignoring user input received after the predetermined period of time such that the gas valve is not opened and the igniter is not actuated in response to the user input received after the predetermined period of time.

3. The method of claim 1, wherein the change in presence is removal of the cooking container from the burner, and wherein the action includes at least one of:

alerting the user about the time elapsed;

indicating to the user about what to do next;

turning off the burner; and/or turning on or off the timer.

4. A method of controlling a cooking appliance comprising:

detecting with one or more sensors a change in presence of one or more cooking containers on one or more burners of the cooking appliance; and providing a controller coupled to the one or more sensors, with the controller;

detecting placement of one or more cooking containers on the one or more burners;

waiting a predetermined period of time for one or more user inputs to activate the one or more burners;

receiving the one or more user inputs;

activating the one or more burners in response to receiving the one or more user inputs prior to an end of the predetermined period of time; and not activating the one or more burners in response to receiving the one or more user inputs after the end of the predetermined period of time.

5. The method of claim 4 wherein activating the one or more burners include controlling a gas valve and/or controlling an igniter.

6. The method of claim 4 wherein the one or more burners is an inductive burner.

7. The method of claim 4 wherein the one or more burners is a gas burner.

8. The method of claim 4 wherein the one or more burners is an electric burner.

9. The method of claim 4 further including illuminating one or more indicators in response to detecting placement of the one or more cooking containers on the one or more burners.

10. The method of claim 9 wherein the one or more indicators is on or proximate a control knob associated with the one or more burners.

11. The method of claim 9 further including discontinuing illuminating the one or more indicators after the end of the predetermined period of time.

12. The method of claim 4 further including deactivating the one or more burners in response to removal of the one or more cooking containers.

13. A method of controlling a cooking appliance comprising:

detecting with a sensor a change in presence of a cooking container on a burner of the cooking appliance; and triggering an action in a programmed cooking sequence in response to detecting the change in presence of the cooking container on the burner with the sensor; and a controller, wherein with the controller:

detecting placement of the cooking container on the burner with the sensor;

waiting a predetermined period of time for user input to activate the burner;

controlling a gas valve and an igniter for the burner to ignite gas supplied by the gas valve to the burner in response to receiving the user input prior to an end of the predetermined period of time; and ignoring user input received after the predetermined period of time such that the gas valve is not opened and the igniter is not actuated in response to the user input received after the predetermined period of time.

14. The method of claim 13 further including a user interface associated with the burner and coupled to the controller, and receiving the user input by the user interface.

15. The method of claim 13 further including deactivating the burner having placement of the cooking container in response to removal of the cooking container.

16. The method of claim 13 further including starting a timer in response to detecting placement of the cooking container on the burner.

17. The method of claim 13 further including illuminating an indicator in response to detecting placement of the cooking container on the burner.

18. The method of claim 17 further including discontinuing illuminating of the indicator after the end of the predetermined period of time.

* * * * *